(12) United States Patent
Fein et al.

(10) Patent No.: US 11,797,637 B2
(45) Date of Patent: Oct. 24, 2023

(54) SYSTEM AND METHOD FOR CONTENT MANAGEMENT IN AN ECOSYSTEM

(71) Applicants: Lance Fein, Davie, FL (US); Gregory Serfer, Camillus, NY (US)

(72) Inventors: Lance Fein, Davie, FL (US); Gregory Serfer, Camillus, NY (US)

(*) Notice: Subject to any disclaimer, the term of this patent is extended or adjusted under 35 U.S.C. 154(b) by 630 days.

(21) Appl. No.: 16/013,303

(22) Filed: Jun. 20, 2018

(65) Prior Publication Data
US 2019/0392046 A1 Dec. 26, 2019

(51) Int. Cl.
| | | |
|---|---|---|
| G06F 16/00 | (2019.01) | |
| G06F 16/958 | (2019.01) | |
| G06F 16/2457 | (2019.01) | |
| G06F 16/68 | (2019.01) | |
| G06F 3/0483 | (2013.01) | |
| H04L 67/10 | (2022.01) | |

(52) U.S. Cl.
CPC ...... *G06F 16/958* (2019.01); *G06F 16/24578* (2019.01); *G06F 16/686* (2019.01); *G06F 3/0483* (2013.01); *H04L 67/10* (2013.01)

(58) Field of Classification Search
CPC .................................................. G06F 16/686
See application file for complete search history.

(56) References Cited

U.S. PATENT DOCUMENTS

| | | | | |
|---|---|---|---|---|
| 8,122,371 B1* | 2/2012 | Keller | ................ | G06Q 30/0203 |
| | | | | 715/780 |
| 2014/0013353 A1* | 1/2014 | Mathur | .............. | H04N 21/4826 |
| | | | | 725/34 |

* cited by examiner

*Primary Examiner* — Ajith Jacob
(74) *Attorney, Agent, or Firm* — Andrew S. Rapacke; The Rapacke Law Group, P.A.

(57) ABSTRACT

Embodiments are described for a system and method for content management in an online ecosystem. The system includes at least one network and a computer system having at least one processor, at least one memory, and at least one I/O device. A client system includes a database. A user performs the steps of searching content stored within a database followed by rating the content. Ratings are compiled and displayed to the ecosystem. Users may vote to accept or deny content for a predetermined time period. If accepted, content is then displayed to the ecosystem of users while the content is associated with a user or group thereof.

20 Claims, 9 Drawing Sheets

| Home | Act | Chat | Groups | Help | GIBE™ TURN IT ON |

About|Sign Out|Profile|Search

Group Amendment

*Group Name: Toys toys

*Title: Toys

*Group Consensus: 51%

Keywords: Barbie, Itouch, electronics, Legos

*Description: Toys are too expensive

*Reason for Amendment:

iancef, 11
Inbox: 0 Notifications: 2
Gibes In Vote: 0, In Discussion: 0
Group Amendments: 0

Group Options

Privacy Settings
☑ Open Membership
☑ Show Members
☑ Show Wall

Confirm

[Submit]

*FIG. 5*

Toys

Total visits 27.

| Home | Act | Chat | Groups | Help |

| Group | Gibes | Wall | Members | Amendment | all messages ▼

2 messages ◄ ► + post fuhnboy
Friday, Oct 19 2012 9:31 PM - Edited

⊕+5  ⊕+3  ⊕+1  ⊕0  ⊕-1  ⊕-3  ⊕-5    601   603 ~ 0

I think it is important to remember that as we get older our toys just become more expensive. Because by definition a toy is anything we buy for our enjoyment that we don't actually need. So it is this mindset that parents should approach the idea of buying toys for their children. OK, they don't need it but what benefits will they derive from it and as importantly will this toy aide in areas where I want my child to develop.

0 replies

Bunting
Sunday, Aug 12 2012 7:22 AM

⊕+5  ⊕+3  ⊕+1  ⊕0  ⊕-1  ⊕-3  ⊕-5    0

Not all toys are expensive. The latest hot toys may be overpriced but you don't have to buy them. Most kids are just happy having a catch with a ball or reading a book

---

GIBE™ TURN IT ON

About | Sign Out | Profile | Search lancef, 11
Inbox: 0 Notifications: 2
Gibes In Vote: 0, In Discussion: 0
Group Amendments: 0

| My Profile | My Groups |
| Create Group | Beta Testing |
| Search | Community |

*FIG. 6*

SYSTEM AND METHOD FOR CONTENT MANAGEMENT IN AN ECOSYSTEM

FIELD

The present invention generally relates to communications over an electronic network, and more specifically to the community moderation of content over an electronic network.

BACKGROUND

In recent years, the utilization of the internet has grown exponentially while replacing more antiquated means for communication between individuals around the world. As is often found, the greatest advantage in a system can also become a source for a correlated disadvantage. The internet allows people to openly express opinions, form discussions, and consume content that is often free and readily available at any time. While this has led to a massive increase in the information available to the average person, the information which they consume is not necessarily curated for accuracy or objectiveness and organized thereby.

A common example includes discussion forums such as Reddit where users engage in a community discussion related to a variety of topics. In practice, almost anyone can submit a statement to the discussion without any bearing on accuracy of their statements. In much the same manner, someone who is accurate or truthful can submit their thoughts on the discussion but may be lost in the vast collection of submissions that accrue on the discussion forum over time.

Some have found means for organizing information in a discussion forum by providing incentives for user engagement, popularity, or consensus and assigning a personal score thereto. Some examples of prior art are discussed below.

U.S. Pat. Pub. No. US2008/0222279 A1 to Lucas Cioffi discloses a system that assembles diverse individual thoughts into collective intelligence, making possible a structured conversation by a networked community. Participants contribute ideas to a robust conversational framework in modular form. Each idea module competes with its peers through an interactive rating process controlled by the community.

U.S. Pat. Pub. No US2009/240516A1 to Sermo, Inc. discloses an approach which presents correct information within an ecosystem. In this approach, information sources are associated with a feedback mechanism.

U.S. Pat. Pub. No. US2014/0108422A1 to Alex Taylor and Brent McNish discloses a method of online collaboration between multiple users. A subject for debate is posted on a website. A number of keywords are assigned to the subject to categorize it. Proposals for the subject are submitted by the users and posted on the site. Other users give their opinion of these proposals through a rating system that allocates points to the proposal. These can include the opinion of the user rating the proposal as well as points attained by that user's own proposals in related subjects.

While the above references, relate to community discussions having curations methods, shortcomings are still present in the arts. An advance is needed wherein individuals or groups of users can be debited points for effectively communicating within a discussion forum. Incentives are provided for the effective communications between users such that valuable content is then curated within the forum. One such improvement in the arts is provided in the various embodiments described herein.

SUMMARY OF THE INVENTION

Embodiments described herein provide for a system and method wherein users share content via a network connected online ecosystem. The invention described throughout the disclosure is intended to promote meaningful and valuable communications throughout the ecosystem. This intention is accomplished by providing a means for a user to rate content within the ecosystem before and during the time it is published to the ecosystem.

In one embodiment, a method for content management within the ecosystem includes the steps of a user searching content stored within a database that is presented in the online ecosystem. If the user locates content they are looking for, they are presented with the opportunity to rate the content. Ratings are compiled and displayed to the ecosystem to indicate a general level of acceptance or disapproval. The rating is then associated with a user or group of users. The content can be sent to a voting implement wherein users can vote to accept or disapprove the content. If approved, the content is indicated as such and displayed to the users.

In a further embodiment, if the user is unable to locate content they are searching or browsing for, further implementations of the method include the user creating content. The content can then be rated by the ecosystem of users as well as voted upon and accepted or disapproved as described above.

In another embodiment, the interface includes a plurality of rating indicators which, in a preferred embodiment, include a plurality of positive and negative integers. In one example, the presented integers are +5, +3, +1, 0, −1, −3, and −5. Each rating submitted by the community of users is totaled into a single integer. It is the rating total that determines the general acceptance of content by the community.

A system for content management within an online ecosystem is also disclosed. The system includes at least one network placing components in communication with one another. A computer system has at least one processor, at least one memory, and at least one I/O device. At least one client system also includes an associated database. A user then performs the steps of searching content stored within a database that is presented in the online ecosystem. If the user locates content they are looking for, they are presented with the opportunity to rate the content. Votes are compiled and if the general consensus is favorable, the content is then displayed to the ecosystem. The rating and vote outcome is then associated with a user or group of users.

In one embodiment, the client system further comprises at least one of the following; at least at least one browser program, at least one software program, and at least one application program.

Other embodiments and advantages of the present invention will be apparent from the following detailed description of the various embodiments and the accompanying drawings.

BRIEF DESCRIPTION OF THE DRAWINGS

A more complete understanding of the embodiments, and the attendant advantages and features thereof, will be more readily understood by references to the following detailed description when considered in conjunction with the accompanying drawings wherein:

FIG. 2 illustrates a screenshot of the people and groups page along with the graphical user interface, according to an embodiment of the present invention;

FIG. 4 illustrates a screenshot of the group page and input fields along with the graphical user interface, according to an embodiment of the present invention;

FIG. 5 illustrates a screenshot of the group page and input fields along with the graphical user interface, according to an embodiment of the present invention;

FIG. 6 illustrates a screenshot of the graphical user interface, according to an embodiment of the present invention;

DETAILED DESCRIPTION

Figure 1:
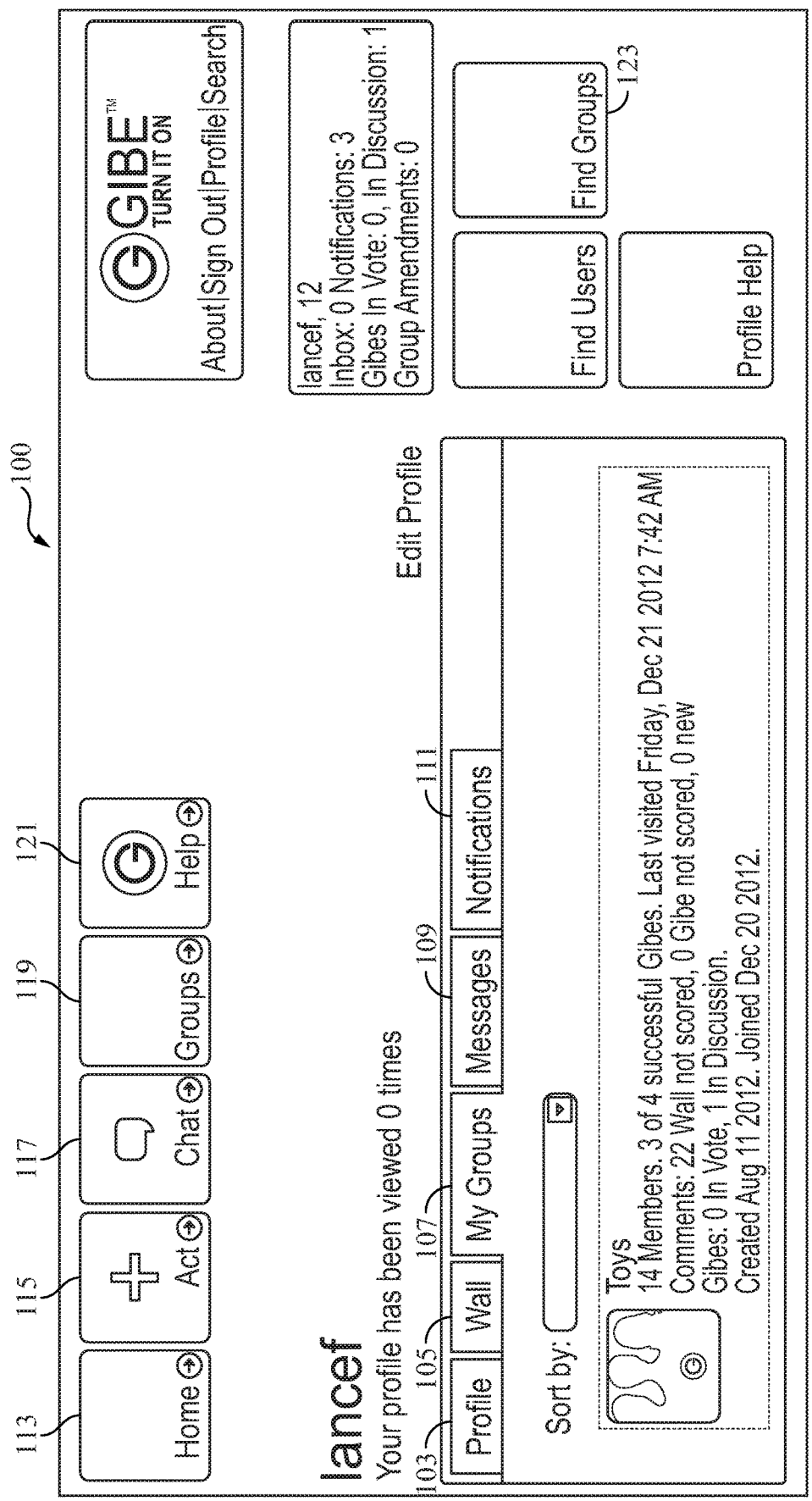
FIG. 1 illustrates a screenshot of the user profile and graphical user interface, according to an embodiment of the present invention.

The specific details of the single embodiment or variety of embodiments described herein are set forth in this application. Any specific details of the embodiments are used for demonstration purposes only and no unnecessary limitation or inferences are to be understood therefrom.

Any reference to "invention" within this document is a reference to an embodiment of a family of inventions, with no single embodiment including features that are necessarily included in all embodiments, unless otherwise stated. Furthermore, although there may be references to "advantage's" provided by some embodiments, other embodiments may not include those same advantages, or may include different advantages. Any advantages described herein are not to be construed as limiting to any of the claims.

Before describing in detail exemplary embodiments, it is noted that the embodiments reside primarily in combinations of components related to the system. Accordingly, the system components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

As used herein, relational terms, such as "first" and "second" and the like, may be used solely to distinguish one entity or element from another entity or element without necessarily requiring or implying any physical or logical relationship or order between such entities or elements.

In general, the invention relates to a system and method for scoring user-generated content in an ecosystem of users as well as a method for providing a consensus of user-generated content. In the following description, the ecosystem relates to any community of users aggregated into a group, whether by subject matter of the content, self-identification by a group of users, a general consensus of opinion, or other means of organizing users in an online community. This organization may be self-organized, or automatically generated by the system. The rating system described herein provides a means for associating the information provided by a user or group of users with a rating mechanism that is indicative of the acceptance of the information. The rating mechanism promotes the distribution of relevant and/or useful information within the ecosystem. The rating mechanism also provides a means for filtering irrelevant and/or useless information. The rating provides additional insurance that the information cultivated by the ecosystem is useful and valuable. The ecosystem may also provide incentives for providing valuable information to the community.

The online ecosystem includes a community of users that together, function to exchange information to one another. The ecosystem may be created such that one or more rules influence the behavior of the users therein. Rules may be designed that provide incentives and disincentives for certain types of behavior and interactions. Preferentially, the rules provide the incentive for valuable information to be shared throughout the ecosystem.

In reference to FIG. 1, the graphical user interface ("GUI") is illustrated in one embodiment of the present invention wherein the user is engaging with the interface 100 and personal profile page. As in a typical online service, community, or webpage, the user may first login with user-specified credentials as known in the arts. This includes an email and password associated with the user. The user may be prompted to create a screen name, gender, keywords, and a description as part of the creation of a profile. The keywords may include personal interests, descriptive words, or other forms of personal identifiers specific to the user. The keywords may aid in the searching of users throughout the community, resulting in a means for finding likeminded or similar users within the ecosystem. The description offers the user an opportunity to input further information about themselves. Further, the user may elect to input a profile picture of their choice.

Private information may be required by the system administrator upon the creation of a profile. This includes an email, names, password, password hint, date of birth, among other credentials specific to the user. A location of each user may be required. Privacy setting permit the user to select what information is made available to other users within the ecosystem.

A plurality of notification settings may be modified by the user. These include, but are not limited to, notifications when posts are made to the profile or to a group wall, when a message is received, when a predetermined rating is achieved, and when an invite is received. Notifications may be sent via email or to the inbox within the interface 100.

A plurality of navigation links are presented on the interface including, but not limited to, a profile terminal 103, wall terminal 105, my groups terminal 107, messages terminal 109, and notifications terminal 111. Each navigation link permits an easy means for accessing information contained on the interface 100. Additional navigation links include a home link 113, act link 115, chat link 117, group link 119, and help link 121. A sidebar 123 is presented to the user having a plurality of links thereon. The sidebar 123 links may change depending on the particular page the user is engaging with on the interface 100.

The profile terminal 103 displays profile information to the user who manages the profile. This includes personal information, statistics and metrics, group information, and otherwise useful information to the user. The wall terminal 105 directs the user to their personal wall. At the wall, the user is able to post personal thoughts and ideas. Dependent on privacy settings, these posts may be visible to other users in the community. Further, other users may post on another user's wall or respond to posts that are present. In an embodiment, each post made is subject to a rating. Once a rating has been made, the post cannot be deleted or altered.

My groups terminal 107 directs the user to a listing of groups which they have subscribed to. In the exemplary embodiment illustrated in FIG. 1, the "Toys" group is shown along with a group statistics portion. Selecting the specific group directs the user to the group page wherein interactions are made.

A messages terminal 109 permits the user to send and receive messages to users within the community. Inactive messages will be organized under an inactive tab if no correspondence is sent for a predetermined period of time. If a response is sent, the message will return to the active tab. The notifications terminal 111 organizes and records notifications sent to the user.

The chat terminal 117 directs the user to an interface for communicating with other users in the community. Communications are sent and received in real-time and are not rated by other users. It is the goal of the chat terminal 117 interface to provide an informal means for communication rather than the scrutinized and regulated communications posted on the wall or group forums.

In thither reference to FIG. 1, index 125 presents, via the GUI 100, a plurality of metrics to the user. In particular, the total number of the user's content currently being voted on as well as the content currently in discussion is presented.

Figure 2:
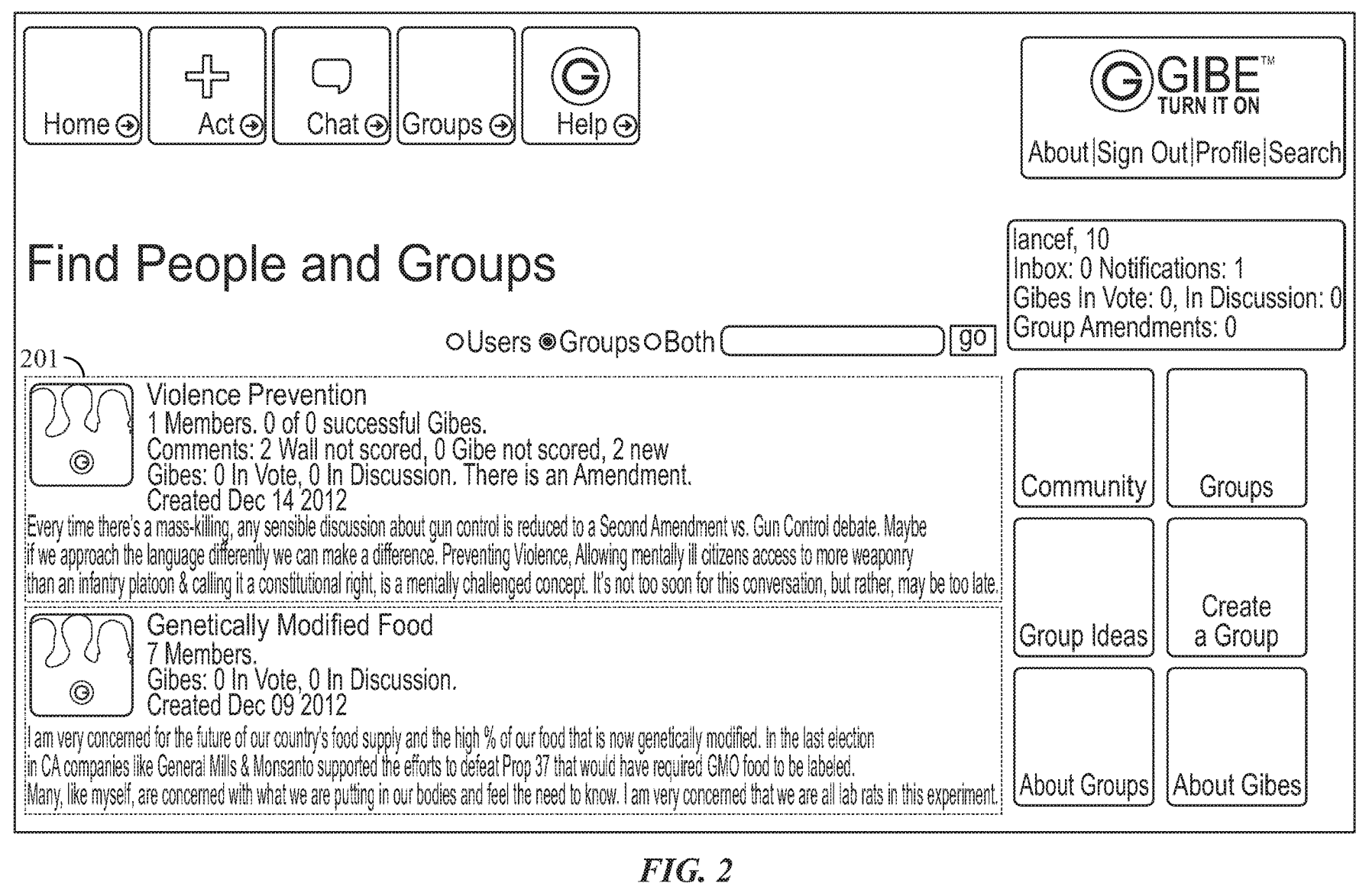
Figure 3:
FIG. 3 illustrates a screenshot of a group page along with the graphical user interface, according to an embodiment of the present invention.

The groups terminal 119 directs the user to the primary interface for managing groups. FIG. 2 illustrates the interface 100, and specifically shows a page wherein users may find users (people) and groups within the online ecosystem. Each group created in the ecosystem will have a group summary section 201 having a group name, image, statistics, total comments, comment statistics, and group status. Selecting a particular group will display further group details to the user which may include as illustrated in FIG. 3 wherein a post on the "Toy" group is shown. As a member of the group, additional information may be shown such as a consensus rule, a listing of members within the group, messages posted to the group wall, and other statistics relevant to the group and user.

Figure 4:
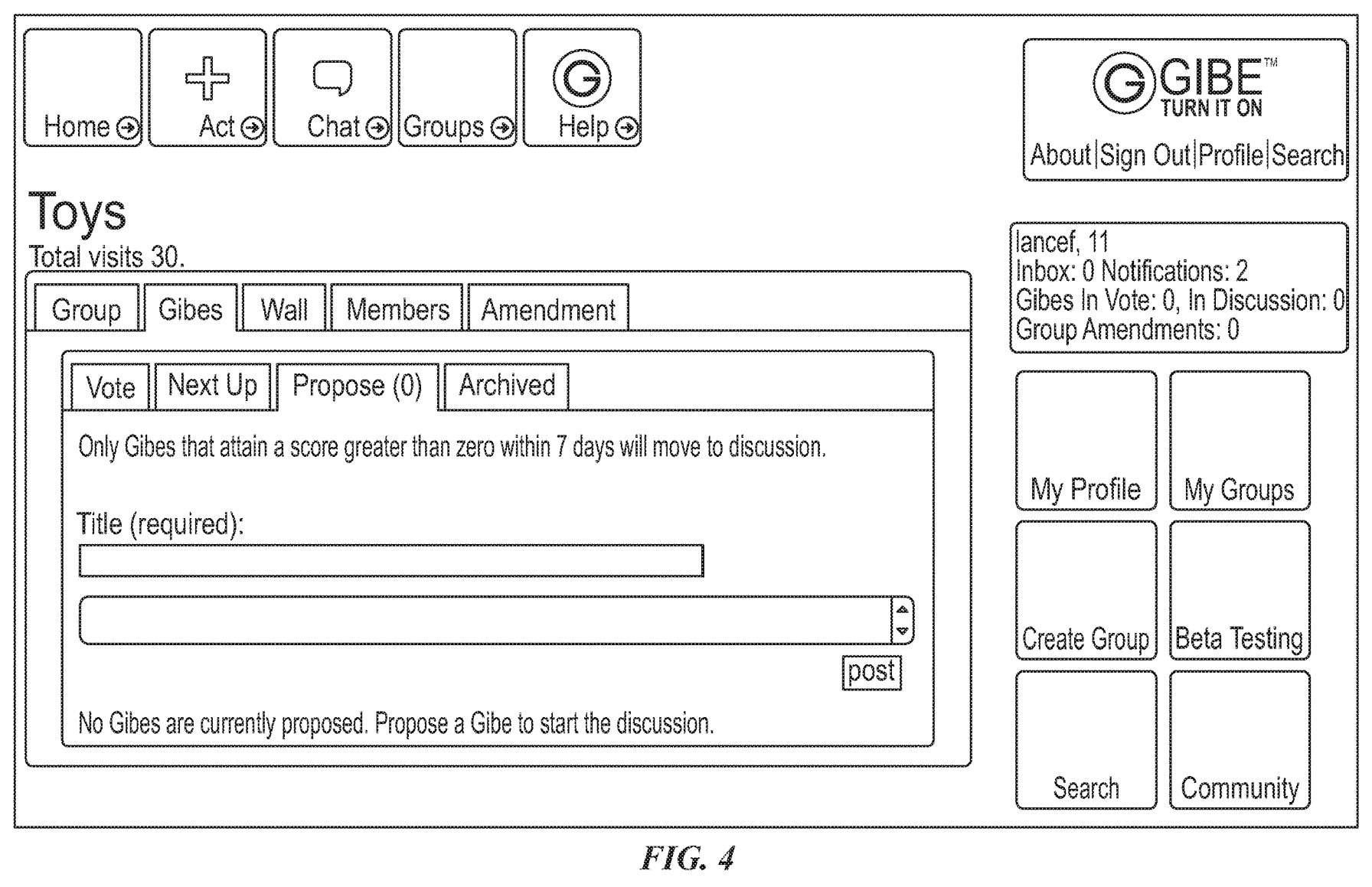

A user is permitted to post to the group wall as illustrated in FIG. 4. A title and content are required by the system. Once posted, the post can be seen as a single post (see FIG. 3) or within a listing (see FIG. 6). Here, other users will be able to rate each post. Rating indicators 601 are displayed in coordination with the specific message the user intends to rate. These indicators may include a +5, +3, 0, −1, −3, and −5 ratings with the positive indicators used to indicate a valuable, useful, accurate, or otherwise favorable message and negative integers reporting a useless, inaccurate, or otherwise invaluable message. It is appreciated that any set or range of integers can be utilized to constitute the indicators. As ratings are accrued, a rating total 603 is then shown. The rating total 603 is the sum of all ratings given to the comment. Alternate embodiments may include an average of all ratings, or otherwise meaningful formula. In use, a first message is posted to the wall of the group. Over a week-long period, ten users read the first message and rate it a +5 using the rating indicators 601. Meanwhile, five user rate the first message a −1. This results in a rating total 603 of +45. A second message is posted at the same time and receives ten −3 ratings over the week-long period, totaling to −30. The system can organize the first message to be shown before the second message, as it was rated to be more valuable, accurate, or useful than the second message. In this manner, the user is incentivized to share valuable information because this is the information made more readily available to the community. In an embodiment, once the user has provided a rating, the user may select the rating total 603 to view submitted ratings by each individual user among other statistics.

Each user maintains a rating total as a metric on their profile which are stored as a rating credit. Once a user reviews content published and made available to the ecosystem, the user can rate content using the integers as described herein. However, integers having a high value require the user to submit their own rating credits in order to rate the content. In one example, a user strongly disagrees with the content they are reviewing and wished to submit a rating of a −5. In the present example, a high value integer includes −5, −3, +3, and +5. In order to do this, the user must utilize 5 of their own rating credits in order for the rating to be submitted to the content. If the user does not have at least 5 credits to expend, the user will only be able to submit the ratings of −1, 0, or +1. While this example utilizes specific integers, it can be appreciated that the accepted integers may vary without departing from the spirit of the invention.

FIG. 5 illustrates an exemplary screenshot wherein the user can make an amendment to the group wall. The user must explain the reasoning for their amendment in addition to the specific amendment to be made.

Figure 7:
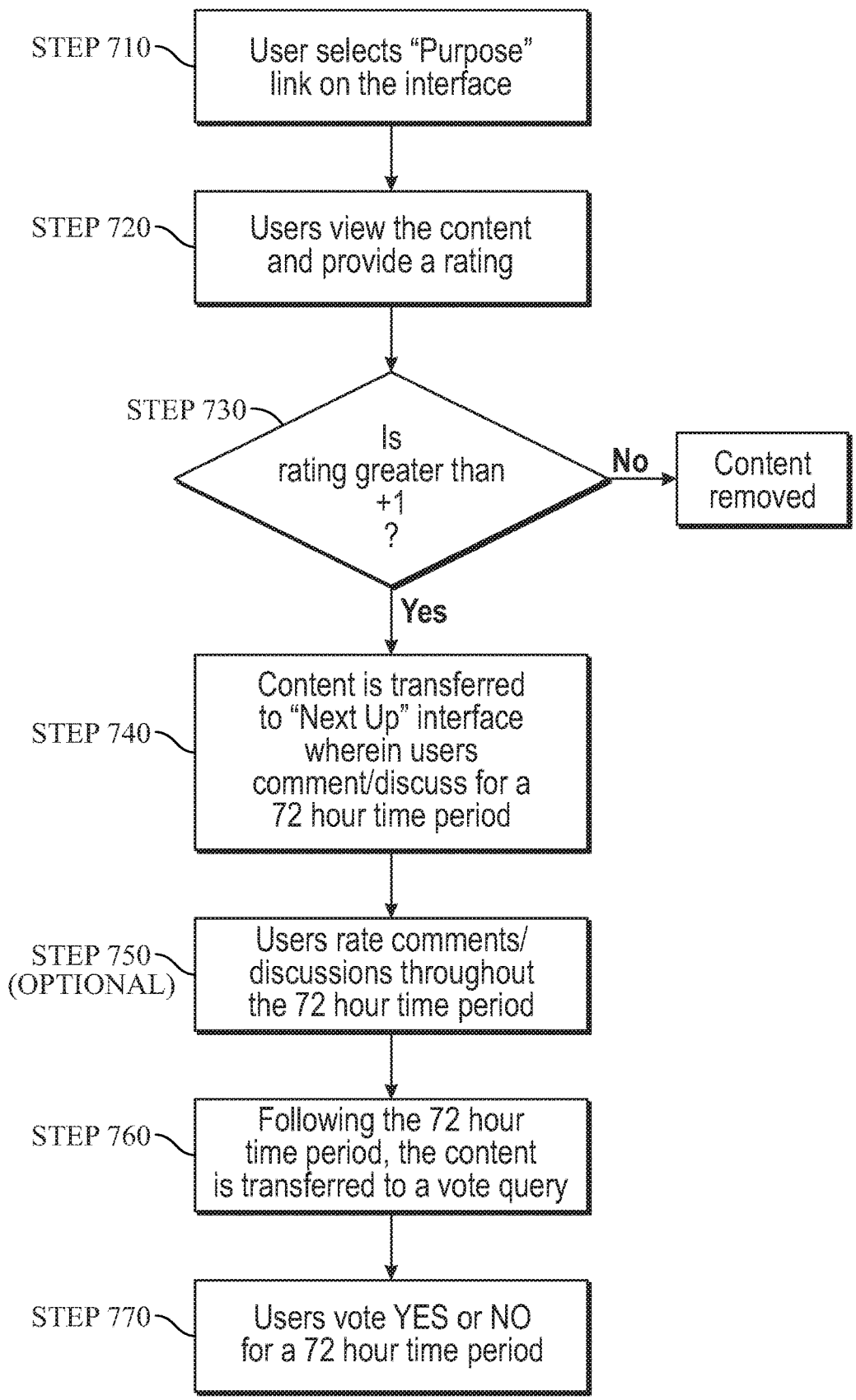
FIG. 7 illustrates a flowchart describing a method of managing content within an online ecosystem, according to an embodiment of the present invention.

FIG. 7 illustrates a system wherein content is voted upon and displayed to a community of users within an online ecosystem. To ensure a fair display of ratings and their associated content, a system is provided for the display of the content and ratings. In step 710, a user selects the purpose tab on interface 100 and inputs content into the appropriate fields. As described above, content may include a title, or description of the topic within the group. In step 720, users view the content and provide a rating utilizing the rating indicators 601 provided on the interface 100 as illustrated in FIG. 6. If a rating of at least +1 is achieved for the content, the content is moved to a "next up" interface in step 730. Only a single content submission is presented in the "next up" query, as this submission is waiting for voting to conclude on a previously submitted content item. Content is moved to the next up query by date if two content submissions have the same rating. In step 740, users are able to discuss, the content for a 72 hour time period. Of course, this time period may be modified without departing from the scope of the invention. Further, users are able to rate comments made for the content submission in optional step 750 (see rating indicators in FIG. 6). In step 760, after the 72 hour time period has elapsed, the content is moved to the "vote" query where an additional 72 hour time period is given for users to vote on the content submission. Voting is only a YES or NO submission from the users with no rating or discussion enabled at the vote query interface, this vote is taken in step 770. Once the content has been accepted as a consensus statement by the ecosystem of users, the accepted content is added to the total of accepted content on the user's profile as shown in index 125 in FIG. 1.

The method as illustrated in FIG. 7 relates to a means for the ecosystem of users to accept content. The acceptance of the content highlights content that the ecosystem agrees upon which can be added to a collection of accepted content within the ecosystem. The content can be associated with a single user, a group of users, or the entire community.

Figure 8:
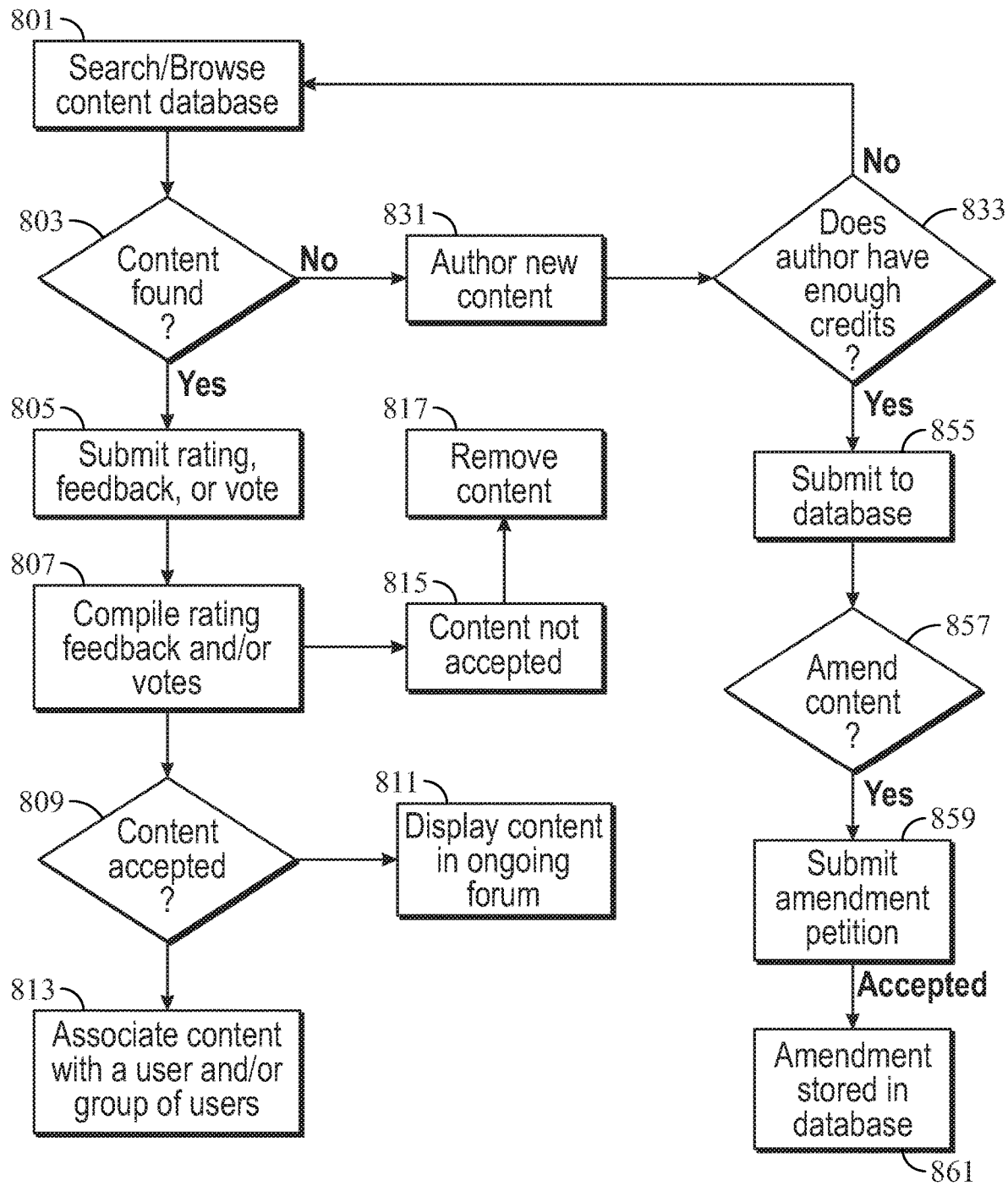
FIG. 8 illustrates a flowchart of a logic flow of content creation, sharing of the content, and the interaction between the user(s) and their created content within the online ecosystem, according to an embodiment of the present invention.

FIG. 8 illustrates a system wherein content is displayed to a community of users in accordance with its rating total 703. The flowchart illustrates a logic flow utilized by the system to permit the engagement of users within the online community. The user utilizes their personal electronic device to search/browse 801 through content stored within the database and displayed to users within the community. If the desired content is found the user may submit a rating 805 dependent upon the consensus of the content. The ratings are compiled 807 and, displayed 809 to the ecosystem of users to give an indication of the acceptance of the content among those who have submitted a rating. Content is then associated 813 with a user and/or group of users. Statistics including user statistics, rating statistics, vote and feedback statistics among other useful metrics are associated with the user and group thereof. In an event wherein content is not accepted 815, the content is removed 817.

In an example wherein content is not found following a search of the content database, the user may choose to create/author new content 831. To ensure content remains relevant, the system may moderate which users or groups of users are able to submit content for rating and voting. Once new content has been authored, the content is submitted to the database 833 and displayed via the GUI 100 to the ecosystem of users. The content can then be rated 855 by any number of users and the rating total is aggregated and displayed. If desired, the new content can be submitted to a voting system 857 as shown and described in FIG. 7, wherein the voting 859 will determine if the content is accepted by the ecosystem of users. If voting does not occur, the content remains published for the ecosystem of users to engage therewith 861.

Optionally, users can amend content 871 by submitting an amendment petition 873 as illustrated in FIG. 5. If the amendment is accepted, the amended content is stored in the database 875.

Ratings may be given to content users and groups based on a multitude of criteria including, but not limited to, relevance, novelty of the subject matter of the content, accuracy, consensus, and/or fidelity. It is realized that the rating total 703 may be presented in a plurality of regions of the interface 100. For example, they may seamlessly appear in conjunction with a user's identifying means on the interface. Identifying means may include the profile page, tide, or on the authored content for each user. Similarly, a rating may be displayed in relation to a group, a content item, or likewise component that may be rated by the community.

Amendments are permitted as a means for updated information in a rapidly changing subject area. This may include groups related to health or similar fields which have inherent uncertainty.

Feedback from the community can cultivate a sense of user ownership as content must be valuable in order for it to remain present on the forum. Accountability is as much important as participation. The user experience within the community can be defined as their interaction, browsing, with other users within the community. In one embodiment, content is selected from a group of relevant content. The group of relevant content is culled dependent on a rating threshold. One example of a threshold is a positive rating total 703 may be required for a 72 hour period for the content to continue to be published on the forum.

In one embodiment, each user accrues a reliability score from the ecosystem of users. This score can be an aggregate of a multitude of metrics and functions to indicate the quality and trustworthiness of each user.

Figure 9:
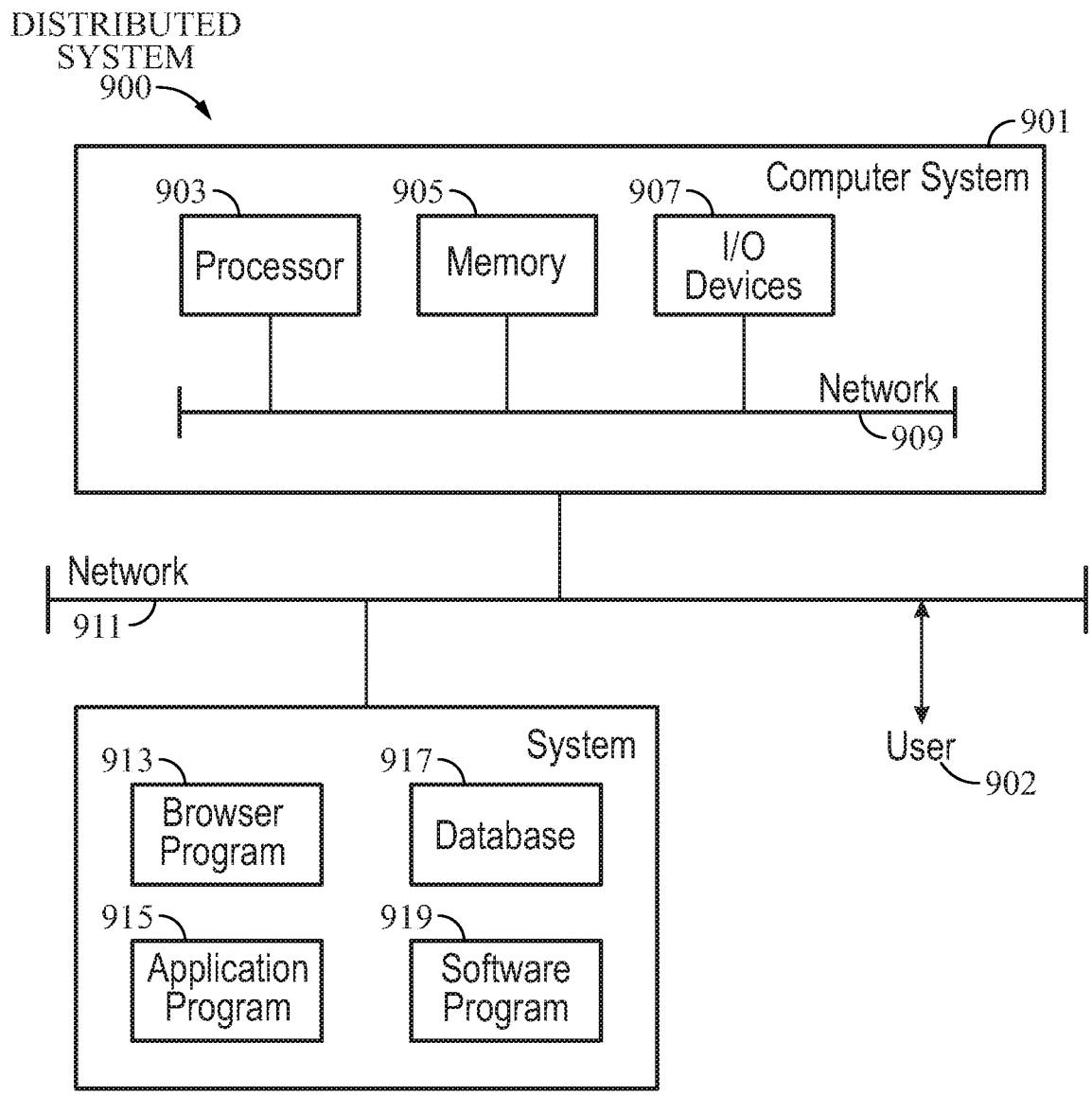
FIG. 9 illustrates a block diagram of a general-purpose computer system with which various aspects of the ecosystem may be practiced, according to an embodiment of the present invention.

FIG. 9 shows an architecture diagram of an example system according to one embodiment of the invention. It should be appreciated that FIG. 9 is used for illustration purposes only, and that other architectures may be used to facilitate one or more aspects of the present invention.

As shown in FIG. 9 a distributed system 900 may be used to conduct functions of the ecosystem, including, but limited to, the creation of content, storing content information, determining and storing indicator information associated with the content, performing rating actions, and storing user information. The system 900 may include one or more computer systems 901 coupled by a communication network 911. Such computer systems may be, for example, general-purpose computer systems as discussed herein.

In one embodiment of the present invention, system 901 stores content information in the form of a discussion forum. Further, the system 901 performs associated functions with the content and its associated rating.

System 901 may include a server process that responds to requests from one or more client programs. The process may include, for example, an HTTP server or other server-based process (e.g., a database server process, XML server, peer-to-peer process) that interfaces to one or more client programs distributed among one or more client systems.

According to one embodiment, client programs and systems thereof may be capable of permitting a user 902 to create, submit, view, search, and rate content within an online ecosystem. Such client programs may include, for example, any type of operating system and/or application program capable of communicating with system 901 through network 911. In one particular instance, a system may include a browser program 913 that communicates with the server using one or more communication protocols (e.g., HTTP over a TCP/IP-based network, XML requests using HTTP through an Ajax client process, distributed objects, etc). The system may further include a database 917, application program 915, and software program 919.

Although it is shown by way of example that a browser program 913 may be used to access the ecosystem by users 902 to perform ecosystem functions, it should be appreciated that other program types may be used to interface a user 902 to the server. For instance, an application program 915 that is specially-developed to manage content data may be provided to permit a user to perform ecosystem functions according to various embodiments of the present invention. The client program may be, for example, a thin client including an interface for managing content data. Alternatively, the client may be a scripted program, or any other type of program having the capability of transferring content data. According to one embodiment, such client programs may, for example, be downloaded and installed over the network 911. Further, these client programs may be stored and distributed by system in the form of one or more software programs 919.

An application program 915 may include one or more controls that, when selected by the user, perform functions for manipulating content information. These controls may be written in a variety of programming languages, and the invention is not limited to any particular language. In one specific example, the control may be a link that, when selected, performs one or more programmed functions. Such functions may permit the user to create, submit, view, search, and rate on content within an online ecosystem.

Information stored in the database 917 may include, for example, content information including, but not limited to, a unique content identifier, a description of the identifier associated with the content, user information such as personal information, usernames, ranking, rating history, classification information associated with the content (e.g., identifier information) and other information that can be used to facilitate the online ecosystem.

This information may be collected from the user 902 in an interface) and stored in the database 917. Additionally, client systems may store a local copy of a user's identifier information within a local database associated with the client system. A client system may include one or more interfaces through which ticket information may be presented to the user. In one example, ticket information and status may be presented in an interface of the browser program 913 executed on a client computer system 901.

In one embodiment, identifiers and ratings received therefrom may initially be provided by the author of the identifier. Further, in another example system, the system may generate and/or suggest other tags that could be associated with the identifier. Such tags may be generated, for example, based on groups of related tags defined for similar identifiers.

In one example, the content created by the user may be compared to one or more databases to determine whether the content is original.

For example, a user may search for and/or set notifications for particular content based on their tag information.

In further reference to FIG. 9, a general purpose computer and network system 1000 are illustrated in an exemplary embodiment. Aspects of the invention may include and be implemented by specialized software executing in one or more computer system including general-purpose computer system 901, which may include a processor 903, in operable communication with at least one memory device 905. The memory device may include a disk drive, solid-state memory, or similar device for the storage of data. Memory 905 is typically utilized for storing data during operation of the computer system 901.

Components of computer system 901 may be coupled by an interconnection mechanism such as network 911, which may include one or more busses (e.g., between components that are integrated within a same machine) and/or a network (e.g., between components that reside on separate discrete machines). The interconnections mechanism enables communications to be exchanged between system components of system 901.

The computer system 901 also includes a plurality of input/output ("I/O") devices 907 such as a keyboard, mouse, trackball, microphone, touch screen, printing device, display screen, speaker, among other I/O devices commonly associated with the arts. In addition, the system 901 includes one or more network connection devices that connect the computer system 901 to a communication network in addition to, or as an alternative of, the network 911.

A storage system includes a computer-readable and writeable nonvolatile recording medium in which signals are stored that define a program to be executed by the processor 903 as well as information to be processed by the program installed thereon. Typically, in operation, the processor 903 causes data to be read from the nonvolatile recording medium into another memory that allows for faster access to the information by the processor than does the medium. This memory is typically a volatile, random access memory such as a dynamic random access memory (DRAM) or static memory (SRAM). The memory may be located in the storage system, as shown, or in memory system 905. The processor 903 generally manipulates the data within the memory, and then copies the data to the medium associated with storage after processing is completed. A variety of mechanisms are known for managing data movement between the medium and integrated circuit memory element and the invention is not limited thereto. The invention is not limited to a particular memory system or storage system. In one example, content may be stored on computer readable medium, as well as graphical indicators for content, targeting criteria may be stored as well, among other options. The processor 903 and operating system together define a computer platform for which application programs 915 in high-level programming languages are written. It should be understood that the invention is not limited to a particular computer system platform, processor, operating system, or network. Also, it should be apparent to those skilled in the art that the present invention is not limited to a specific programming language or computer system. Further, it should be appreciated that other appropriate programming languages and other appropriate computer systems could also be used.

One or more portions of the computer system may be distributed across one or more computer systems coupled to a communications network. These computer systems also may be general-purpose computer systems. For example, various aspects of the invention may be distributed among one or more computer systems (e.g., servers) configured to provide a service to one or more client computers, or to perform an overall task as part of a distributed system. For example, various aspects of the invention may be performed on a client-server or multi-tier system that includes components distributed among one or more server systems that perform various functions according to various embodiments of the invention. These components may be executable, intermediate (e.g., IL) or interpreted (e.g., Java) code which communicate over a communication network (e.g., the Internet) using a communication protocol (e.g., TCP/IP).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

It will be appreciated by persons skilled in the art that the present embodiment is not limited to what has been particularly shown and described hereinabove. A variety of modifications and variations are possible in light of the above teachings without departing from the following claims.

What is claimed is:

1. A method for content management within an online ecosystem, the method comprising the steps of:

searching content, via at least one user, wherein the content is stored within a database;

rating the content by the at least one user using a rating indicator from a set of pre-defined rating indicators, wherein the set includes a first number of lower-valued rating indicators and a second number of higher-valued rating indicators;

implementing the following:

preventing the at least one user from rating the content using one of the higher-valued rating indicators when the user fails to submit corresponding user-specific rating credits, and
allowing the at least one user to rate the content using only one of the lower-valued rating indicators when the user fails to submit the user-specific rating credits;
compiling the ratings from the at least one user;
associating the compiled ratings with the at least one user;
displaying at least part of the content to a plurality of users via a graphical user interface when the compiled ratings are above a pre-determined threshold,
wherein the at least part of the content displayed to the plurality of users is displayed content;
determining that a first pre-defined time period has elapsed for the displayed content; and
after the first pre-defined time period has elapsed, allowing voting, via the plurality of users, on the displayed content to accept or deny the displayed content, wherein the displayed content accepted is accepted content;
wherein the displayed content is associated with at least one group, and wherein the accepted content is associated with the at least one user.

2. The method of claim 1, further comprising the steps of:
a. creating a new content via the at least one user;
b. submitting the new content to the database; and
c. submitting, via the plurality of users, ratings for the new content using the set of pre-defined rating indicators;
wherein the submitted content is voted on by the ecosystem when the compiled ratings corresponding to the new content are above the pre-determined threshold and after the first pre-defined time period has elapsed.

3. The method of claim 1, further comprising the step of:
determining a rating total based on the set of pre-defined rating indicators.

4. The method of claim 3, further comprising the step of:
associating the rating total with a user or a group.

5. The method of claim 4, further comprising the step of:
generating a consensus opinion of the user or the group based on the voting.

6. A computer-implemented method comprising the steps of:
searching content, via at least one user using a computer system, wherein the content is stored within a database;
rating, using the computer system, the content by the at least one user using a rating indicator from a set of pre-defined rating indicators, wherein the set includes a first number of lower-valued rating indicators and a second number of higher-valued rating indicators;
implementing the following using the computer system:
preventing the at least one user from rating the content using one of the higher-valued rating indicators when the user fails to submit corresponding user-specific rating credits, and
allowing the at least one user to rate the content using only one of the lower-valued rating indicators when the user fails to submit the user-specific rating credits;
compiling, using the computer system, the ratings from the at least one user;
associating, using the computer system, the compiled ratings with the at least one user;
displaying, using the computer system, at least part of the content to a plurality of users when the compiled ratings are above a pre-determined threshold, wherein the at least part of the content displayed to the plurality of users is displayed content;
determining, using the computer system, that a first pre-defined time period has elapsed for the displayed content; and
after the first pre-defined time period has elapsed, allowing, using the computer system, voting, via the plurality of users, on the displayed content to accept or deny the displayed content, wherein the displayed content accepted is accepted content;
wherein the displayed content is associated with at least one group, and wherein the accepted content is associated with the at least one user.

7. The computer-implemented method of claim 6, wherein the method further comprises the steps of:
a. creating, using the computer system, a new content via the at least one user;
b. submitting, using the computer system, the new content to the database; and
c. submitting, using the computer system and via the plurality of users, ratings for the new content using the set of pre-defined rating indicators,
wherein the submitted content is voted on by the ecosystem when the compiled ratings corresponding to the new content are above the pre-determined threshold and after the first pre-defined time period has elapsed.

8. The computer-implemented method of claim 6, wherein the method further comprises the step of:
determining, using the computer system, a rating total based on the set of pre-defined rating indicators.

9. The computer-implemented method of claim 8, wherein the method further comprises the step of:
associating, using the computer system, the rating total with a user or a group.

10. The computer-implemented method of claim 9, wherein the rating total is utilized to accept content, and wherein the rating total is aggregated following a predetermined time period.

11. A system for content management within an online ecosystem,
the system comprising:
at least one network;
a computer system having at least one processor, at least one memory, and at least one I/O device;
at least one client system having at least one database; and
at least one user, wherein the system is operable to perform the steps of:
searching content, via the at least one user, wherein the content is stored within the at least one database;
rating the content by the at least one user using a rating indicator from a set of pre-defined rating indicators, wherein the set includes a first number of lower-valued rating indicators and a second number of higher-valued rating indicators;
implementing the following:
preventing the at least one user from rating the content using one of the higher-valued rating indicators when the user fails to submit corresponding user-specific rating credits, and
allowing the at least one user to rate the content using only one of the lower-valued rating indicators when the user fails to submit the user-specific rating credits;
compiling the ratings from the at least one user;
associating the compiled ratings with the at least one user;
displaying at least part of the content to a plurality of users when the compiled ratings are above a predetermined threshold, wherein the at least part of the content displayed to the plurality of users is displayed content;

determining that a first pre-defined time period has elapsed for the displayed content;

after the first pre-defined time period has elapsed, allowing voting, via the plurality of users, on the displayed content to accept or deny the displayed content, wherein the displayed content accepted is accepted content;

wherein the displayed content is associated with at least one group, and wherein the accepted content is associated with the at least one user.

12. The system of claim 11, wherein the at least one client system further comprises at least one of the following; at least one browser program, at least one software program, and at least one application program.

13. The system of claim 11, wherein the system is further operable to perform the steps of:
   a. creating a new content via the at least one user;
   b. submitting the new content to the at least one database; and
   c. submitting, via the plurality of users, ratings for the new content using the set of pre-defined rating indicators;

wherein the submitted content is voted on by the ecosystem when the compiled ratings corresponding to the new content are above the pre-determined threshold and after the first pre-defined time period has elapsed.

14. The system of claim 11, wherein the set of pre-defined rating indicators comprises a plurality of positive and negative integers.

15. The system of claim 14, wherein a rating total is determined based on the set of pre-defined rating indicators result.

16. The system of claim 15, wherein the rating total is associated with the at least one user or the at least one group.

17. The system of claim 16, wherein the rating total is utilized to accept content.

18. The method of claim 1, further comprising:
   allowing voting on the displayed content only for a second pre-defined time period; and
   preventing the at least one user from rating the displayed content during the second pre-defined time period.

19. The computer-implemented method of claim 6, further comprising:
   allowing, using the computer system, voting on the displayed content only for a second pre-defined time period; and
   preventing, using the computer system, the at least one user from rating the displayed content during the second pre-defined time period.

20. The system of claim 11, wherein the system is further operable to perform the steps of:
   allowing voting on the displayed content only for a second pre-defined time period; and
   preventing the at least one user from rating the displayed content during the second pre-defined time period.

\* \* \* \* \*